United States Patent
Delgado Acarreta et al.

(10) Patent No.: US 11,428,395 B2
(45) Date of Patent: Aug. 30, 2022

(54) SYSTEM AND METHOD FOR PROVIDING INFORMATION ABOUT PRESENCE IN A SPACE

(71) Applicant: RADE TECNOLOGÍAS, S.L., Saragossa (ES)

(72) Inventors: Raúl Delgado Acarreta, Saragossa (ES); Alejandro Pérez Paño, Saragossa (ES); José Cuesta Álvarez, Saragossa (ES); Bernardo Navarro Almiñana, Saragossa (ES); Daniel Osuna Sanz, Saragossa (ES); Alejandro Gállego Torrijos, Saragossa (ES); Javier Izcara Lausín, Saragossa (ES)

(73) Assignee: RADE TECNOLOGÍAS, S.L., Saragossa (ES)

( * ) Notice: Subject to any disclaimer, the term of this patent is extended or adjusted under 35 U.S.C. 154(b) by 207 days.

(21) Appl. No.: 17/012,184

(22) Filed: Sep. 4, 2020

(65) Prior Publication Data

US 2021/0063005 A1 Mar. 4, 2021

(30) Foreign Application Priority Data

Sep. 4, 2019 (EP) ..................................... 19382758

(51) Int. Cl.
*F21V 23/04* (2006.01)
*H05B 47/115* (2020.01)
(Continued)

(52) U.S. Cl.
CPC ...... *F21V 23/0471* (2013.01); *F21V 23/0435* (2013.01); *H05B 47/115* (2020.01);
(Continued)

(58) Field of Classification Search
CPC . F21V 23/0435; F21V 23/0471; H05B 47/16; H05B 47/19; H05B 47/115
See application file for complete search history.

(56) References Cited

U.S. PATENT DOCUMENTS

| 7,985,953 B2 | 7/2011 | Luterotti et al. |
| 9,720,086 B1 | 8/2017 | Skowronek et al. |

(Continued)

FOREIGN PATENT DOCUMENTS

| EP | 3171348 A1 | 5/2017 |
| GB | 2351825 A | 1/2001 |

(Continued)

OTHER PUBLICATIONS

EP Search Report dated Feb. 3, 2020 re: Application No. EP 19 38 2758, pp. 1-6, citing: US 2015/0379851 A1, US 2019/0049570 A1, US 2018/0239965 A1, WO 2017/134012 A1, U.S. Pat No. 7,985,953 B2, WO 2015/106949 A1 and GB 2 351 825 A.

*Primary Examiner* — Alexander H Taningco
*Assistant Examiner* — Pedro C Fernandez
(74) *Attorney, Agent, or Firm* — Cantor Colburn LLP (57) ABSTRACT

A system for providing information about presence in a space
  includes a movement sensor for generating a signal upon detecting movement; and
  a presence sensor for generating a signal upon detecting presence, being a temperature-based matrix sensor having an array of sensing elements.
The system further includes
  a processing and/or control component in communication with the movement and presence sensors, configured to generate a presence signal upon receiving the first and/or second signals; and configured to obtain background information of the presence detection field. The information includes reference temperature values and are obtained (Continued)

upon the movement sensor not detecting movement and/or the presence sensor detecting presence. For each sensing element with presence, using the measured temperature value of surrounding sensing elements not having presence. If all surrounding sensing elements have presence, using the measured temperature value of some sensing elements surrounding the former surrounding sensing elements not having presence.

15 Claims, 5 Drawing Sheets

(51) Int. Cl.
*H05B 47/19* (2020.01)
*H05B 47/16* (2020.01)
*H04W 4/80* (2018.01)

(52) U.S. Cl.
CPC ............. *H05B 47/16* (2020.01); *H05B 47/19* (2020.01); *H04W 4/80* (2018.02)

(56) References Cited

U.S. PATENT DOCUMENTS

| | | |
|---|---|---|
| 2015/0379851 A1 | 12/2015 | Diels |
| 2016/0138976 A1 | 5/2016 | Schilz et al. |
| 2018/0239965 A1* | 8/2018 | Aggarwal ............. G01J 1/0238 |
| 2019/0049570 A1* | 2/2019 | Xiong ................... G08B 25/14 |

FOREIGN PATENT DOCUMENTS

| | | | |
|---|---|---|---|
| GB | 2544072 | A | 5/2017 |
| JP | 2001304655 | A | 10/2001 |
| WO | 2015063479 | A1 | 5/2015 |
| WO | 2015106949 | A1 | 7/2015 |
| WO | 2017134012 | A1 | 8/2017 |
| WO | 2018019561 | A1 | 2/2018 |

* cited by examiner

SYSTEM AND METHOD FOR PROVIDING INFORMATION ABOUT PRESENCE IN A SPACE

CROSS REFERENCE TO RELATED APPLICATIONS

This application is related to and claims the benefit of European Patent Application No. 19382758.1, filed on Sep. 4, 2019, the contents of which are herein incorporated by reference in their entirety.

TECHNICAL FIELD

The present disclosure generally relates to the field of improving reliability in detecting human presence within a specific area or space.

BACKGROUND

The control of electric systems, and more specifically the control of lighting systems, to make sure that they are only active when required—for instance, when the room is not empty and the person(s) inside is(are) not sleeping—is a known problem. In this respect, one of the problems is that of having an accurate information of whether there is presence of a human being within that room, so that the lighting systems is not erroneously kept on while there is no human presence within the room, or less frequently but also possible, that it is turned off while someone is still in the room.

Patent document WO 2015/063479 A1 discloses an apparatus for controlling an electrical load of a room. The apparatus comprises an occupancy sensor (a thermopile array) responsive to the presence of a person within its detection field, a movement sensor responsive to the movement of a person within its detection field and a controller which receives detection signals from the occupancy and the movement sensors and, in response, generates control signals for the electrical load. By combining the information provided by these two sensors to generate control signals for the electrical load, improved person detection can be achieved.

However, the system disclosed in WO 2015/063479 A1 merely detects presence and movement, but it is not capable of clearly and efficiently distinguishing persons from other elements in the room which may have a temperature similar to that of a human being.

Therefore, there is a need for a simple, low-power consuming system which is capable of reliably distinguishing persons and/or animals from other elements in a specific room or space which may have a temperature similar to that of a human being and which could erroneously lead to false positives in detecting human presence.

SUMMARY

The present disclosure solves the aforementioned problems by disclosing a system for providing information about presence in a space, the system providing reliable information about the background of the space or room, thereby being able to more precisely discriminate human beings from other hot elements or spots in the same space.

A first aspect of the disclosure relates to a system for providing information about presence in a space, the system comprising:

a movement sensor configured to generate a first signal upon detecting movement within its movement detection field;

a presence sensor configured to generate a second signal upon detecting presence within its presence detection field, the presence sensor being a temperature-based matrix sensor comprising an array of sensing elements;

the movement detection field and the presence detection field being within the space;

processing and/or control means in communication with the movement sensor and the presence sensor, the processing and/or control means being configured to generate at least a presence signal upon receiving the first signal and/or the second signal from the movement sensor and/or the presence sensor, respectively;

the processing and/or control means being configured to obtain background information of the presence detection field, the background information comprising reference temperature values of the array of sensing elements of the presence sensor, the background information being obtained:

upon the movement sensor not detecting movement within its movement detection field; and/or, upon the presence sensor detecting presence within its presence detection field, and for each sensing element of the array of sensing elements in which presence has been detected by the presence sensor, using the measured temperature value of some surrounding sensing elements, preferably all surrounding sensing elements, which do not have human presence, or, if all surrounding sensing elements have human presence, using the measured temperature value of some (preferably all) sensing elements surrounding the former surrounding sensing elements which do not have human presence.

In certain embodiments, the processing and/or control means are configured to periodically obtain the background information of the presence detection field.

Thanks to the specific configuration for obtaining the background information of the presence detection field, so that the background information is updated, preferably periodically, the system of the present disclosure is capable of more precisely discriminating human beings from other hot elements or spots in the same space.

In certain embodiments, the measured temperature value of the surrounding sensing elements which do not have human presence is averaged and the resulting average value is used as background information for the sensing element in which presence has been detected. Preferably all surrounding sensing elements are used and averaged, to provide a more realistic background information.

Also, when all first surrounding sensing elements have human presence, and the second surrounding sensing elements which do not have human presence are used (that is, the sensing elements surrounding the first surrounding sensing elements), the measured temperature value thereof is averaged and the resulting average value is used as background information for the sensing element in which presence has been detected. Preferably all surrounding sensing elements are used and averaged, to provide a more realistic background information.

In both cases (when using first surrounding or second surrounding sensing elements), it is also possible to use some surrounding elements, not all of them, such as:

alternate surrounding elements; or surrounding elements whose measured temperature does not exceed a specific threshold value.

The space wherein presence information is provided can be an indoor space (such as a room within a building) or an outdoor space, in which reliable information about presence is desired or needed.

In some embodiments, the presence sensor is configured to detect presence within its presence detection field using a difference between a temperature measured in each of its sensing elements value and the reference temperature value of each sensing element, the difference being enlarged by a correction factor. This correction factor is intended to amplify the difference between measured and reference temperature values, so as to be able to detect presence, even when the measured temperature is too close to the reference value provided by the background information. Using this correction factor provides optimal detection results, with very few false positives.

The system can be configured to operate in at least two operation modes:
a first matrix mode; and,
a second time/movement mode;
the processing and control means being able to switch from the first matrix mode to the second time/movement mode when the second signal provided by the presence sensor is determined to be unreliable.

In the first matrix mode, presence is detected in most cases. The movement sensor is mainly used if the presence matrix is not reliable. In the second time/movement mode, detection can be established even when the presence matrix is not reliable, which is mainly the case wherein the temperature of the background information is similar to that of a human being or certain animals. In these circumstances, the movement sensor is used and provides higher reliability. Using both modes and being able to combine the information provided by both modes, very high reliability in detection is achieved.

In certain embodiments the movement sensor is a temperature-based movement sensor, which provides an economic but reliable solution, which can be wireless and has low-battery consumption.

It should be noted that the system may comprise more than one movement sensor(s) and/or more than one presence sensor(s); this way, the movement and the presence detection fields covered by the respective movement and presence sensor(s) can be adapted to the specific needs of the space whose presence is to be monitored by the system of the disclosure.

In certain embodiments, the movement detection field is configured to be bigger than the presence detection field; that is, the movement detection field covers an area which is greater than an area covered by the presence detection field. This specific configuration is advantageous in that the movement sensor(s)—which are usually cheaper—can provide a first wider detection, while the presence sensor can be used to provide a more precise detection.

The system may further comprise an acoustic sensor and/or a capacitive sensor to detect that the space has been empty for a pre-established time interval, thereby providing a further proof of no presence in the space; then, the processing and/or control means can be preferably configured to update the background information.

In certain embodiments, the presence signal generated by the processing and control means is used to actuate over an electric system, the electric system being preferably associated to that space. In some embodiments the electric system to be controlled is a lighting system and/or a HVAC system (a heating, ventilation, and air-conditioning system), for example, in a hospital or building. The electric system to be controlled can also be an alarm system; for instance, in a building where a hazard has been established (such as fire or any other risky situation) and evacuation is desirable (or even mandatory), the presence signal generated by the system of the disclosure being used to set off an alarm system.

The different elements of the system need not be in the space whose presence is controlled or information is provided thereof. For instance, the case of an air-conditioning system, the presence and movement sensors can be installed in a room or space, while the air-conditioning system is probably installed outside that space, and it may be used for that space and for other spaces or rooms within the same building.

In certain embodiments, the presence signal is used in an absenteeism control system. In this case, the presence and movement sensors can be installed in the space or room wherein presence of an employee is to be controlled (for example, the office of that employee, or the entry of the office where that employee works).

The presence signal can also be used for statistical purposes related to that space. Such as the number of persons standing in front of a specific product or advertisement stand, to evaluate the impact of that product or advertisement on the public at a specific location.

A lights or brightness sensor can be connected to processing and/or control means. Having this additional lights sensor allows to regulate the level of light of the space depending on the ambient lighting of the space to be controlled. Without this additional lights sensor, it is only possible to actuate over the lightings system turning it on or off. This additional sensor allows to adjust the level of brightness to the specific conditions of the space. For example, if the space receives lots of sun light during the morning, you may configure the brightness sensor as follows:
At night: 100% brightness
Morning: 30% brightness
Afternoon: 70% brightness Communications within the system can be wireless, preferably using Bluetooth or BLE or Zigbee. A wireless configuration simplifies installation and adapting the system and its components to the specific needs of the space or the room, and the building where these are located.

The system can be preferably implemented in a single housing, providing a more compact solution and easiness of installation.

Another aspect of the disclosure relates to a method for providing information about presence in a space, the method comprising:
generating a presence signal upon receiving a first signal and/or a second signal from a presence sensor and/or a movement sensor, respectively, the presence sensor and the movement sensor being located in the space, the presence sensor being a temperature-based matrix sensor comprising an array of sensing elements;
the method further comprises:
obtaining background information of a presence detection field covered by the presence sensor, the background information comprising reference temperature values of the array of sensing elements of the presence sensor:
by measuring temperature values of all sensing elements of the array of sensing elements when the movement sensor does not detect movement within its movement detection field; and,
when the presence sensor detects presence within its presence detection field, for each sensing element of the array of sensing elements in which presence has been detected by the presence sensor, by using the measured temperature value of some surrounding sensing elements which do not have human presence (preferably all surrounding sensing elements are used), or, if all surrounding sensing elements have human presence, by using the measured temperature value of some sensing elements (preferably all sensing elements) surrounding the former surrounding sensing elements which do not have human presence.

In certain embodiments, the measured temperature value of the surrounding sensing elements which do not have human presence is averaged and the resulting average value is used as background information for the sensing element in which presence has been detected. Preferably all surrounding sensing elements are used and averaged, to provide a more realistic background information.

Also, when all first surrounding sensing elements have human presence, and the second surrounding sensing elements which do not have human presence are used (that is, the sensing elements surrounding the first surrounding sensing elements), the measured temperature value thereof is averaged and the resulting average value is used as background information for the sensing element in which presence has been detected. Preferably all surrounding sensing elements are used and averaged, to provide a more realistic background information.

Another aspect of the disclosure relates to a method for controlling an electric system, which comprises using the presence signal generated by the method or the system defined in any previous aspect or embodiment to actuate over the electric system. The electric system can be a lighting system or an HVAC system.

Another aspect of the disclosure relates to a method for controlling work absenteeism, which comprises using the presence signal generated by the method or the system defined in any previous aspect or embodiment to feed an absenteeism system of personnel.

The system and methods of the present disclosure generally relate to the field of improving reliability in detecting human presence within a specific area or space. And to using such reliable presence information in optimizing energy consumption in buildings, and more specifically to keeping the lighting or HVAC (Heating, Ventilating and Air Conditioning) systems off or at low-power mode whenever possible. And to controlling presence of employees or personnel at a work environment.

The different aspects and embodiments of the disclosure defined in the foregoing can be combined with one another, as long as they are compatible with each other.

Additional advantages and features of the disclosure will become apparent from the detail description that follows and will be particularly pointed out in the appended claims.

BRIEF DESCRIPTION OF THE DRAWINGS

For the purpose of completing the description and in order to better understand the disclosure, a set of drawings is attached. These drawings form an integral part of the description and illustrate an embodiment of the disclosure, which should not be interpreted as restricting the scope of the disclosure, but just as an example of how the disclosure can be carried out. The drawings comprise the following figures.

DETAILED DESCRIPTION OF THE DRAWINGS

The following description is not to be taken in a limiting sense but is given solely for the purpose of describing the broad principles of the disclosure. Embodiments of the disclosure will be described by way of example, with reference to the above-mentioned drawings.

Figure 1:
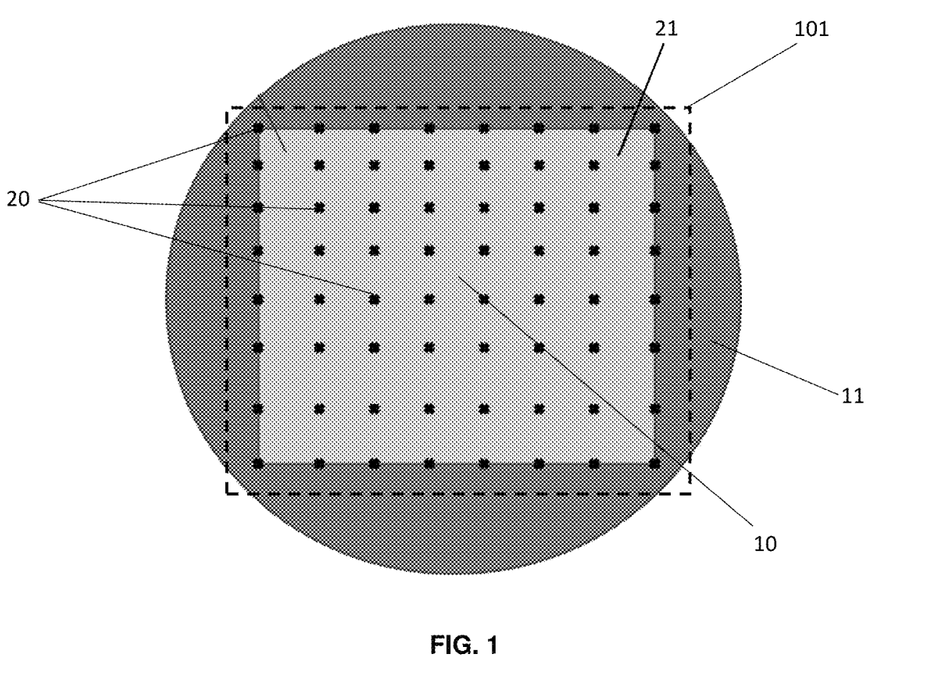
FIG. 1 shows a schematic representation of the space and the movement and detection fields.

According to a preferred embodiment, the present disclosure discloses a system 100 for controlling a lighting or HVAC system of a space 101. The system 100 comprises at least two sensors.

One of these at least two sensors is a temperature-based movement sensor, which in this example is a single PIR sensor 10 mounted on the ceiling of the room 101 (its projection on the floor is shown in FIG. 1). Though not shown, it is also possible to use a capacitive sensor as movement sensor. This PIR sensor 10 is responsive to movement within a movement detection field 11, which in the present example essentially coincides with the size of the room 101 in which the system to be controlled is installed. This PIR sensor has a semispherical Fresnel lens, which may be modified to change the movement detection field 11 covered by the PIR sensor 10.

The other one of the at least two sensors is a temperature-based presence sensor, which in this example is a matrix sensor 20 also mounted on the ceiling of the room 101. This matrix sensor 20 comprises 64 elements or pixels, distributed in an 8×8 array, each element of the 64 elements measuring the temperature of a zone inside the room. The 64 zones covered by the 64 elements or pixels form an area which, in the present example is inside the room 101 in which the system to be controlled is installed, but it is smaller than the size of the room 101; this area constitutes the presence detection field 21.

When the system 100 is started, reference temperature values are taken for the each of the 64 zones, this reference temperature values constituting background (BG) information or BG matrix of the presence detection field 21. During operation of the system, in order to establish whether there is presence or not, the temperature is measured in each of these 64 elements or pixels and is compared to the reference temperature values for each of the 64 elements or pixels. For this comparison, a difference between the measured temperature value and the reference temperature value of each sensing element or pixel is used, this difference is enlarged by a correction factor so as to be able to detect presence even when the measured values are close to the background information. The matrix sensor 20 determines that there is presence within the presence detection field 21, when in at least one pixel of the 64 pixels, the comparison is greater than a specific temperature threshold. The specific temperature threshold in the present example is set to 1° C., but other threshold values could be used depending on the specific application.

The system 100 further comprises a processor 30 or central unit, which is connected to the PIR sensor 10 and to the matrix sensor 20. In the present disclosure, communication between the different components is carried out wirelessly, using Bluetooth Low Energy (BLE) in this specific example.

Figure 2:
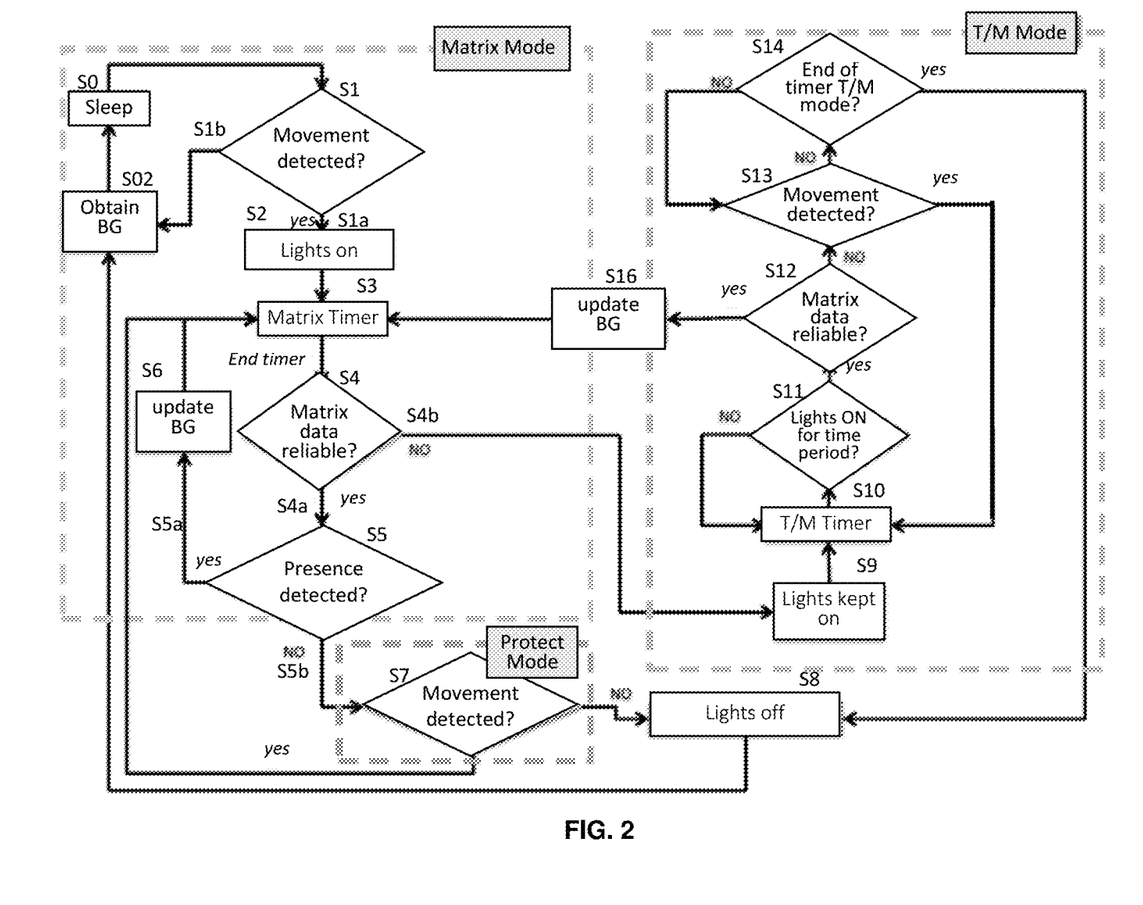
FIG. 2 is a flowchart showing the main steps and operation modes of the system of the present disclosure.

Operation of the system 100 will be explained in the following, with the aid of FIG. 2.

The system 100 is in sleep or low-power mode (step S0) until the PIR sensor 10 detects that there is movement within its movement detection field 11, that is, within the room 101 (step S1-S1a). Upon the PIR sensor 10 detecting that there is movement within the room, the system 100 is awakened and starts operating in a first Matrix mode; a movement signal is sent to the central unit 30, which actuates over the lighting system in the example, turning it on (step S2).

If no movement is detected by the PIR sensor 10 (step S1-S1b), the system obtains the background information (step S02) and returns to its low-power mode state (step S0).

In this first operation mode (matrix mode), a matrix timer is initiated (step S3) and the matrix sensor 20 starts to measure the temperature of the 64 zones at predefined intervals. The matrix sensor 20 then determines in which zone(s) of the 64 zones is the person or object who has been detected.

There is a check whether the data provided by the matrix sensor 20 is reliable or not (step S4). The reliability of the matrix data is later explained with reference to FIG. 3. If the data provided by the matrix sensor 20 is determined not to be reliable (S4b), the lighting system is kept on (step S9) and the system enters a second Time/Movement operation mode (which will be explained further below).

Figure 3:
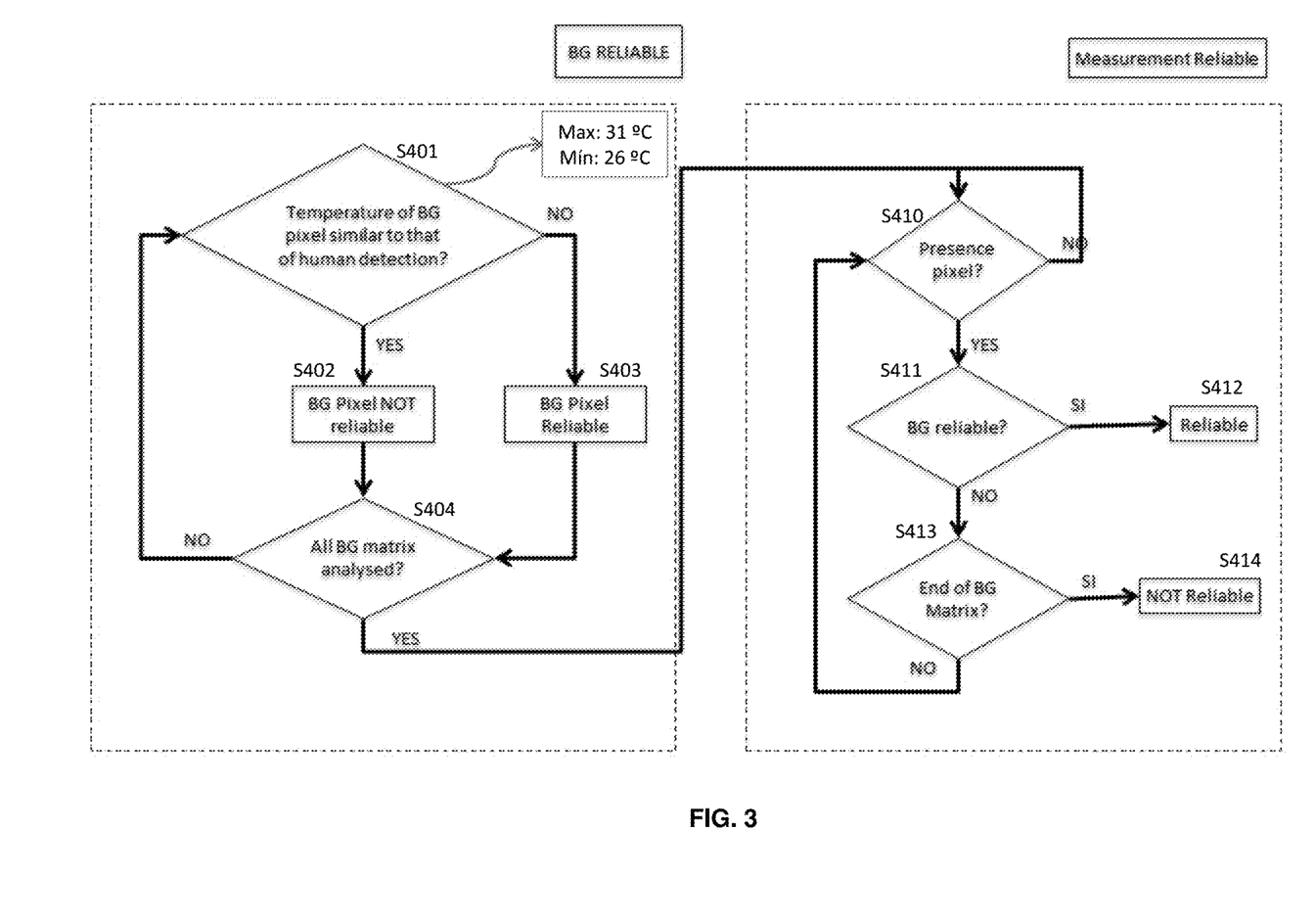
FIG. 3 is a flowchart explaining when the data provided by the matrix data is determined to be reliable (decision step S4 and S12 of the flowchart of FIG. 2)

If at decision step S4 the data provided by the matrix sensor 20 is reliable (S4a), and the matrix sensor 20 has detected presence (S5-S5a), the light system is maintained on and the background information of the room is updated (step S6). Updating the background information is later explained with reference to FIG. 4. If no presence is detected (step S5-S5b), a further check (step S7) is carried out on whether the PIR sensor 10 detects movement or not (so as to make sure that the entire room is still there being neither presence nor movement therein-) and if no movement is detected, the system enters in a protection mode wherein the light system is turned off (step S8). Again, the system obtains the background information (step S02) and returns to its low-power mode state (step S0). If at decision step S7 some movement is detected, the matrix timer is restarted (step S3).

In the second operation mode (Time/Movement or T/M mode), a time/movement timer is initiated (step S10). A time check is done (step S11), whether the lights have been on for a specific period of time (which is established in a case by case basis). If so, there is a further check whether the data provided by the matrix sensor 20 is reliable or not (step S12). If the data provided by the matrix sensor 20 is determined not to be reliable, a further movement check is carried out (step S13). If no movement is detected for a certain time interval, the light system is turned off (step S8), with a prior check whether the T/M timer has ended (step S14) before the light or HVAC system is actually turned off. If at decision step S13 some movement is detected, the T/M timer is restarted. If at decision step S12 the data provided by the matrix sensor 20 is determined to be reliable, the system updates the background information (step S16) and returns to the Matrix mode (at step S3, where the matrix timer is initiated).

The flowchart of FIG. 3 explains when the data provided by the matrix data is determined to be reliable or not. That is, the decision step S4 and S12 of the flowchart of FIG. 2, which is carried out for each and every pixel of the matrix.

At decision step S401, it is determined if the temperature of the pixel of the background (BG) matrix is similar to that of a human or some animals (that is, between 26° C. and 31° C.), in which case the BG pixel is established as not reliable (step S402); else, the BG pixel is established as reliable (step S403). This process is repeated until all pixels of the BG matrix have been analysed (step S404).

It is then established at decision step S410, whether there is presence in the pixel which is being analysed. If there is no presence in that pixel, the process continues for the following pixel (at S410). If there is presence in the pixel, it is checked (at decision step S411) whether that specific pixel had been established as having reliable background or not at step S401. If it was reliable, then the pixel is established reliable (step S412). Otherwise is repeated (step S413) until all pixels of the BG matrix have been analysed, and if no pixel is established as reliable, then the matrix is determined to be not reliable (step S414).

So, firstly the reliability of the background (BG) matrix is analysed (left-hand part of FIG. 3); this analysis results in a matrix with reliable and unreliable pixels. Then, the matrix data is analysed as whether there is presence or not (right-hand part of FIG. 3). Pixels which have been established as having presence, are then checked as whether they were reliable or not (left-hand part). If there is a pixel in which there is presence and its information is also reliable, the matrix is considered to be reliable. If no pixel in the matrix meets these two conditions, the matrix is established as not reliable.

Figure 4:
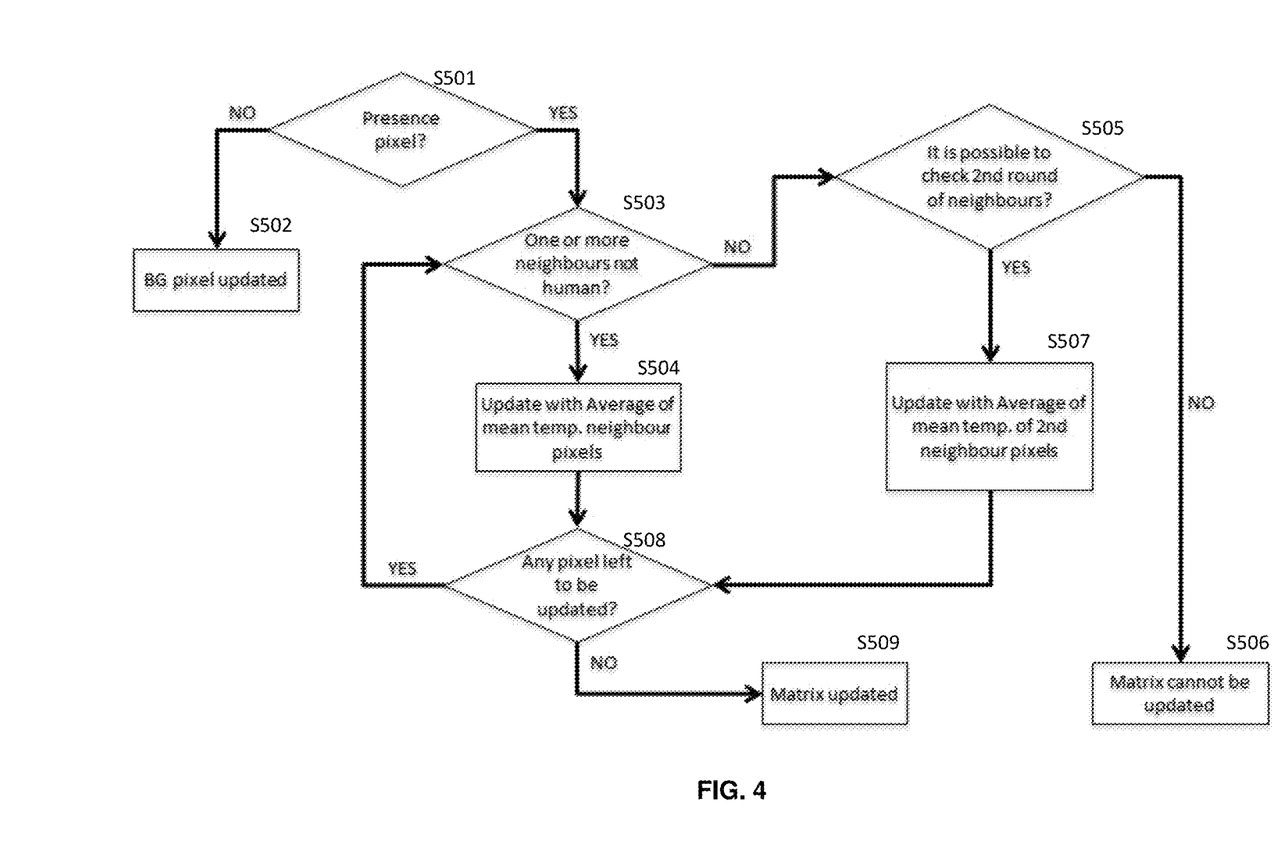
FIG. 4 is a flowchart explaining how the background (BG) information is updated.

FIG. 4 is a flowchart explaining how the background (BG) information is updated, when presence has been detected (step S501) in a pixel. When presence has not been detected, updating of the background information or BG matrix takes place periodically (step S502), at preestablished time intervals. If the pixel has presence, it is then checked (at decision step S503) if any of the neighbour pixels does not have human presence (either there is no presence, or the presence is established as being an object or similar, but not human). If one or more of the neighbour pixels to the one being analysed does not have human presence, then the temperature of that pixel is updated (step S504) with an average of the temperature of all neighbour pixels which do not have human presence. If all neighbour pixels are human, the following line of neighbour pixels is then checked (at decision step S505) to see if there is some pixel with no human presence. If again all 2nd-round neighbour pixel have human presence, it is established that the matrix cannot be updated (step S506). If in this analysis of 2nd-line neighbours, one or more of the 2nd-neighbour pixels does not have human presence, then the temperature of the pixel is updated (step S507) with an average of the temperature of all 2nd-neighbour pixels which do not have human presence. In either case the process is repeated (step S508) until there is no pixel left to be analysed. And the background matrix is updated accordingly (step S509).

The scope of the system in the example just disclosed is: ceiling height of 2.5 m; presence detection field of 9 $m^2$ and movement detection field of 25 $m^2$.

Although not shown in the drawings, the system 100 may further include a microphone or connection therewith, to determine periods of time in which the room is empty and so update the reference temperature values of the matrix.

Figure 5:
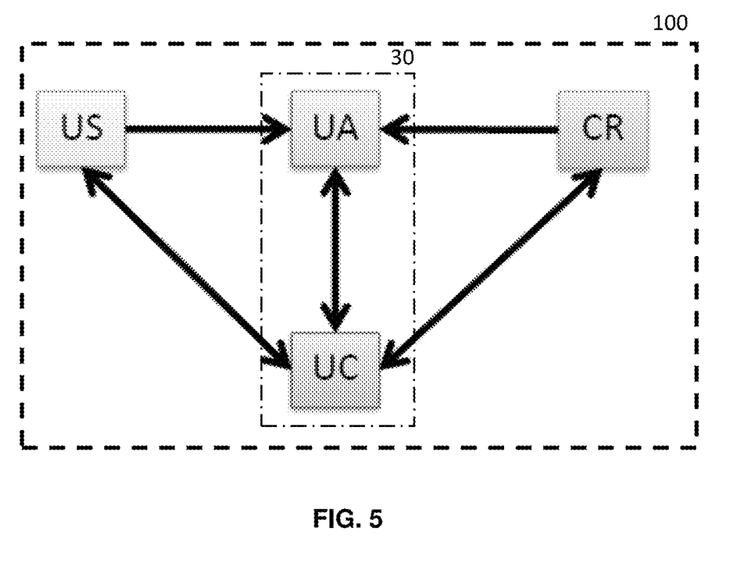
FIG. 5 is a block diagram of the functional components of the system of the disclosure.

Another aspect that has been improved in the present system is communications between the different components thereof, so that the system is scalable. FIG. 5 shows how the communications between the different components of the system 100 is established.

The main components of the system 100 may be functionally described as follows:
- the configuration unit (UC), which is in charge of configuring the other units and of collecting information about whether each room (or specific space to be monitored in respect to presence) is occupied or empty;
- actuation unit (UA), which collects data from the sensor units (US) and makes a decision whether to turn on or off the lighting or HVAC system;
- the sensor units (US), which in the present example include in the PIR sensor 10 and the matrix sensor 20, and are in charge of measuring certain physical parameters of the room, such as presence, temperature, movement, light intensity, etc. Further sensors may be included in the sensor units US, such as light sensors, acoustic sensors, etc.

The configuration unit (UC) and the actuation unit (UA) may be configured as separate units, or may be configured in a single processor 30 or central unit. In a same room it is possible to have a single actuation unit for several sensor units, a single sensor unit for several actuation units, or an actuation unit for each sensor unit.

The system 100 may further comprise a remote-control unit (CR) for remote control of the light system. This remote-control unit (CR) also works via BLE, and enables for permanently switching on or off the light system; it also enables activating the automatic operation of the system.

The invention claimed is:

1. A system for providing information about presence in a space, the system comprising:
   a movement sensor configured to generate a first signal upon detecting movement within its movement detection field;
   a presence sensor configured to generate a second signal upon detecting presence within its presence detection field, the presence sensor being a temperature-based matrix sensor comprising an array of sensing elements;
   the movement detection field and the presence detection field being within the space;
the system comprises:
   processing and/or control means in communication with the movement sensor and the presence sensor, the processing and/or control means being configured to generate a presence signal upon receiving the first signal and/or the second signal from the movement sensor and/or the presence sensor, respectively;
   the processing and/or control means being configured to obtain background information of the presence detection field, the background information comprising reference temperature values of the array of sensing elements of the presence sensor, the background information being obtained:
      upon the movement sensor not detecting movement within its movement detection field; and
      upon the presence sensor detecting presence within its presence detection field, and for each sensing element of the array of sensing elements in which presence has been detected by the presence sensor, using the measured temperature value of a plurality of surrounding sensing elements which do not have human presence, or, if all of the plurality of surrounding sensing elements have human presence, using the measured temperature value of some sensing elements surrounding the plurality of surrounding sensing elements which do not have human presence.

2. The system of claim 1, wherein the processing and/or control means are configured to periodically obtain the background information of the presence detection field.

3. The system of claim 1, wherein the measured temperature value of the plurality of surrounding sensing elements which do not have human presence is averaged and an average value is used as background information for the sensing element in which presence has been detected.

4. The system of claim 1, wherein all of the plurality of surrounding sensing elements are used.

5. The system of claim 1, wherein the system is configured to operate in at least two operation modes:
   a first matrix mode; and,
   a second time/movement mode;
the processing and control means being able to switch from the first matrix mode to the second time/movement mode when the second signal provided by the presence sensor is determined to be unreliable.

6. The system of claim 1, wherein the movement sensor is a temperature-based movement sensor.

7. The system of claim 1, further comprising an acoustic sensor and/or a capacitive sensor to detect that the space has been empty for a pre-established time interval, the processing and/or control means being configured to update background information.

8. The system of claim 1, wherein the presence signal generated by the processing and/or control means is used to actuate over an electric system.

9. The system of claim 8, wherein the electric system is a lighting system, and/or an HVAC system, and/or an alarm system.

10. The system of claim 1, further comprising lights sensor connected to processing and/or control means.

11. A method for providing information about presence in a space, the method comprising the following steps:
   generating a presence signal upon receiving a first signal and/or a second signal from a presence sensor and/or a movement sensor, respectively, the presence sensor and the movement sensor being located in the space, the presence sensor being a temperature-based matrix sensor comprising an array of sensing elements;
the method further includes the following steps:
   obtaining background information of a presence detection field covered by the presence sensor, the background information comprising reference temperature values of the array of sensing elements of the presence sensor:
      by measuring temperature values of all sensing elements of the array of sensing elements when the movement sensor does not detect movement within its movement detection field; and,
      when the presence sensor detects presence within its presence detection field, for each sensing element of the array of sensing elements in which presence has been detected by the presence sensor, using the measured temperature value of a plurality of surrounding sensing elements which do not have human presence, or, if all of the plurality of surrounding sensing elements have human presence, by using the measured temperature value of some sensing elements surrounding the plurality of surrounding sensing elements which do not have human presence.

12. The method for controlling an electric system, which comprises using the presence signal generated by the system of claim 1 to actuate over the electric system.

13. The method of claim 12, wherein the electric system is a lighting system, an HVAC system, and/or an alarm system.

14. The method for controlling work absenteeism, which comprises using the presence signal generated by the system of claim 1 to feed an absenteeism system of personnel.

15. The method of claim 11, wherein the measured temperature value of the plurality of surrounding sensing elements which do not have human presence is averaged and an average value is used as background information for the sensing element in which presence has been detected.

\* \* \* \* \*